United States Patent [19]

Wiggins

[11] 4,083,493

[45] Apr. 11, 1978

[54] POSITIVE CHECK VALVE CONTROL UNIT FOR COLOR CHANGE SYSTEM

[75] Inventor: Richard F. Wiggins, Fairfield, Conn.

[73] Assignee: The Gyromat Corporation, Bridgeport, Conn.

[21] Appl. No.: 774,109

[22] Filed: Mar. 3, 1977

Related U.S. Application Data

[62] Division of Ser. No. 649,074, Jan. 14, 1976, abandoned.

[51] Int. Cl.² ............................................. B05B 15/02
[52] U.S. Cl. .................................................. 239/112
[58] Field of Search ...................... 239/112, 125, 266; 137/607

[56] References Cited

U.S. PATENT DOCUMENTS

| | | | |
|---|---|---|---|
| 2,679,865 | 6/1954 | Griffith | 137/607 X |
| 3,348,774 | 10/1967 | Wiggins | 239/112 X |
| 3,537,479 | 11/1970 | Nelson | 137/607 X |

Primary Examiner—John J. Love
Attorney, Agent, or Firm—Mandeville and Schweitzer

[57] ABSTRACT

A positive check valve control unit is disclosed for use in the color change system of an industrial paint spray installation to insure the proper functioning of the system. The control unit of the invention comprises a plurality of check valves connected to a valve body provided with a common outlet duct. Each check valve includes a passage with a discharge opening for communication with the common outlet duct. A ball check is movably positioned in the passage and is urged by biasing means against the opening to protrude into the common outlet duct and close the passage.

A unique feature of the present invention is the provision of a cam plunger in the common outlet duct, positioned to engage and displace the protruding ball checks against the biasing means, to positively open the passages thereby allowing paint or other process fluids to flow through the check valve and out the outlet duct. Actuating means connected to the cam plunger selectively advances the cam into the ball check displacing position when it is desired to open all the check valves as during a color change cycle.

3 Claims, 3 Drawing Figures

POSITIVE CHECK VALVE CONTROL UNIT FOR COLOR CHANGE SYSTEM

This is a division of application Ser. No. 649,074, filed Jan. 14, 1976, now abandoned.

BACKGROUND AND SUMMARY OF THE INVENTION

Industrial paint spray installations often incorporate a system for effecting a color change cycle. Such systems are desirable in high volume production operations where several differently colored products are produced in a typical production day. The prior art has heretofore offered several advantageous arrangements for effecting a color change. Representative of prior proposals are the systems of the Richard F. Wiggins U.S. Pat. No. 3,348,774 and the Richard F. Wiggins co-pending application Ser. No. 468,973, filed May 10, 1974, both owned by The Gyromat Corporation. The subject matter of Wiggins copending application Ser. No. 468,973, filed May 10, 1974 is hereby incorporated by reference into the present application.

In accordance with the teachings of both of these prior proposals, a discharge or purge system is connected to the paint delivery system for each of the several spray devices, substantially at the spray devices themselves, as close to the spray discharge outlet as is reasonably practicable. For example, in the improved system of the co-pending application, a purge line header is connected to each spray device through an individual check valve and an individual purge line connected at a point downstream of the spray device's fluid regulator. The purge header line is connected through a first trap valve, an elongated inventory line and a second trap valve to a purge outlet line.

While the above-described system is ideally suited for typical industrial paint spray installations, efficient operation of the system requires reliable functioning of the individual check valves in a difficult environment. A sticky check valve or plugged duct valve, can, for example, result in an occasional failure to properly discharge and segregate different colors of purged paints, with consequent loss of paint recovery efficiency.

Accordingly, it is the basic objective of the present invention to provide a novel and improved, positive check valve control unit to insure the proper functioning of all check valves in a color change system or the like. Generally, the new positive check valve control unit comprises a valve body provided with a common outlet duct and a plurality of individual check valves attached thereto. In practical applications the valve body will be provided in a square or hex stock, for example, to accommodate four or six check valves (one to a side).

Each check valve will include a passage with a discharge opening for communication with the common outlet duct. The valve action comprises a ball check movably positioned in the passage and biased by biasing means against the common outlet duct opening with the ball check protruding into the common duct. In one advantageous form, spring means can be used to bias the ball check. In other forms, the biasing can be achieved by a magnet and steel ball arrangement or by pressure developed by fluids in the color change system, for example.

To particular advantage, the present invention provides a unique cam plunger arrangement in the common outlet duct, for displacing the protruding ball checks outward against the biasing means, to positively open the check valves. The plunger is actuated in conjunction with the color change cycle to insure that the check valves open properly when required. The cam is attached to the end of a plunger shaft which lies along the center axis of the common outlet duct and extends through a bore in the valve body to engage an actuator disc of an actuating means enclosed within the valve body. To advantage, an air activated bellows assembly can be utilized as the actuating means.

Normally, spring means acting between the valve body and actuator disc axially retracts the plunger shaft and attached cam plunger out of contact with the ball checks so that the check valves remain in a closed position. When it is desired to open the check valves the bellows is expanded by the introduction of air under pressure causing the actuator disc to move against the spring means and impart axial movement to the plunger shaft and cam. This advances the cam plunger to its ball check displacing position. Conveniently, the bellows can be actuated with high pressure air from an air-paint override solenoid already employed as an element in the above described color change systems. In other forms of the invention, an electrical relay or similar device can be employed as the actuating means.

For a better understanding of the above and other features and advantages of the invention, reference should be made to the following detailed descriptions, and to the accompanying drawings.

DETAILED DESCRIPTION OF THE PREFERRED EMBODIMENT

Figure 1:
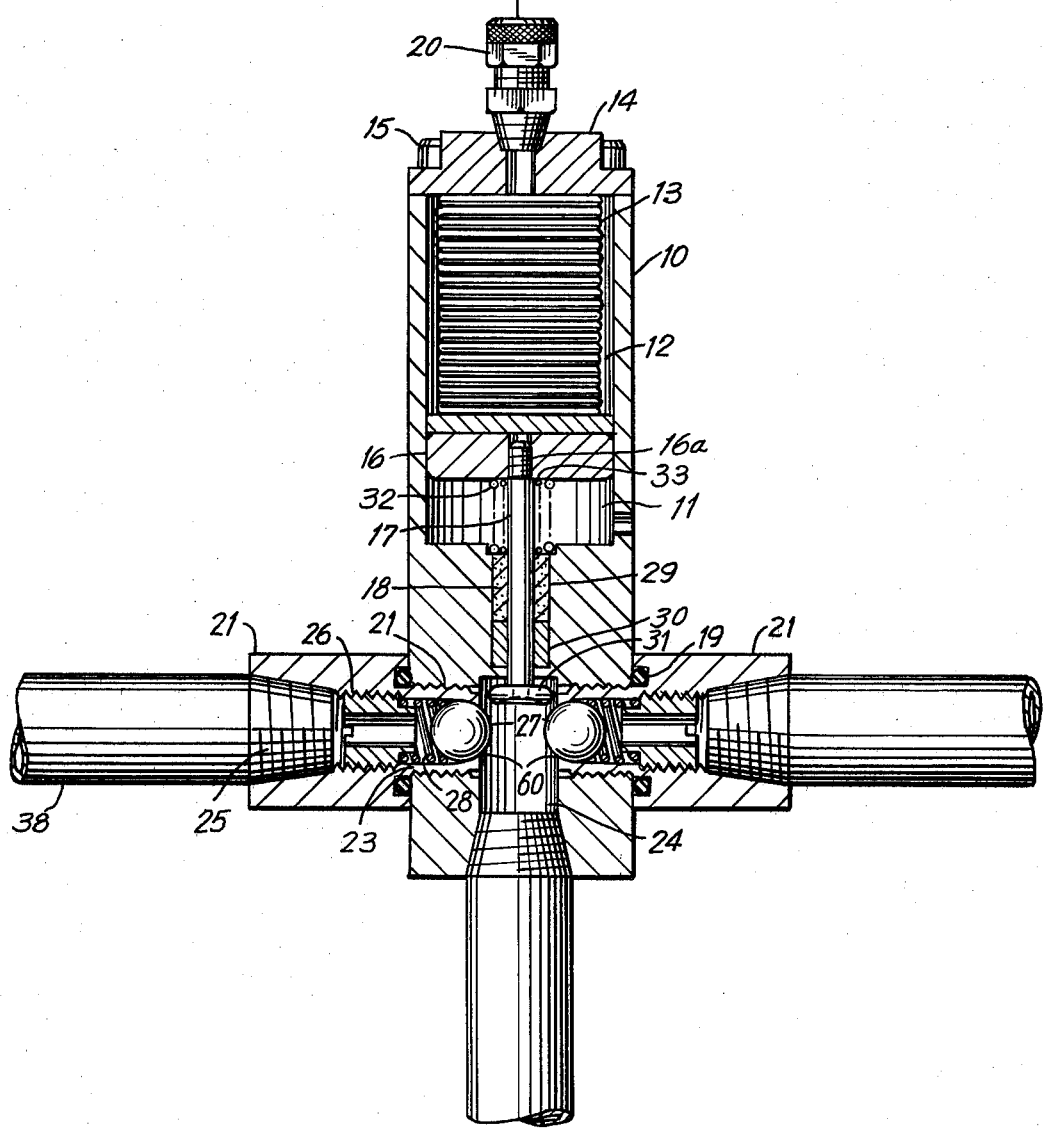
FIG. 1 is a side sectional view of the positive check valve control unit of the present invention.
Figure 2:
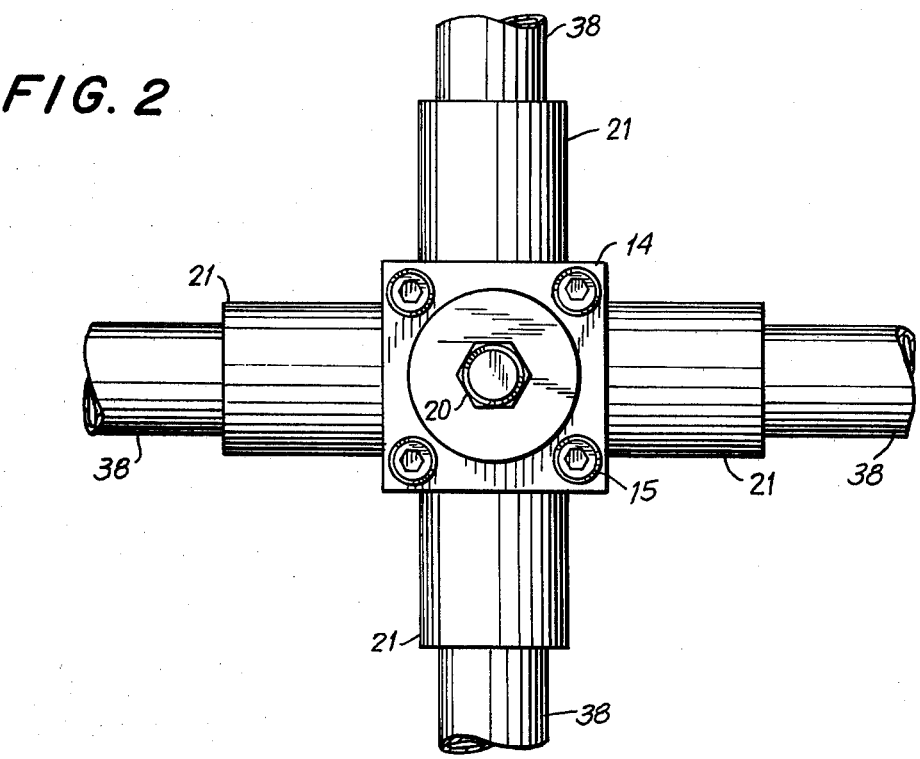
FIG. 2 is a top plan view of the positive check valve control unit of FIG. 1.

Referring now to the drawings, the positive check valve control unit of the present invention includes a valve body 10 provided with a chamber 11 to receive a bellows assembly 12. The bellows assembly 12 comprises an air actuated bellows 13 secured at one end to a cap 14 designed to fit over the open end of the chamber 11 and secured to the valve body 10 by a plurality of cap screws 15. The cap 14 includes a connector fitting 20 to provide air communication between a source of high pressure air (not shown) and the interior of the bellows 13.

A movable guide disc assembly 16 is secured to the lower end of the bellows 13. The disc assembly 16 is guided for axial movement in the chamber 11 and is provided with a threaded bore 16a at the center axis thereof to receive a plunger shaft 17. The middle portion of valve body 10 is substantially solid and has a bore 18 along the center axis thereof for slidably receiving the shaft 17. The bore 18 opens to a common outlet duct 24 in the valve body 10. The valve body 10 is also provided with a plurality of inlet ports 23 to receive check valve assemblies 21.

Figure 3:
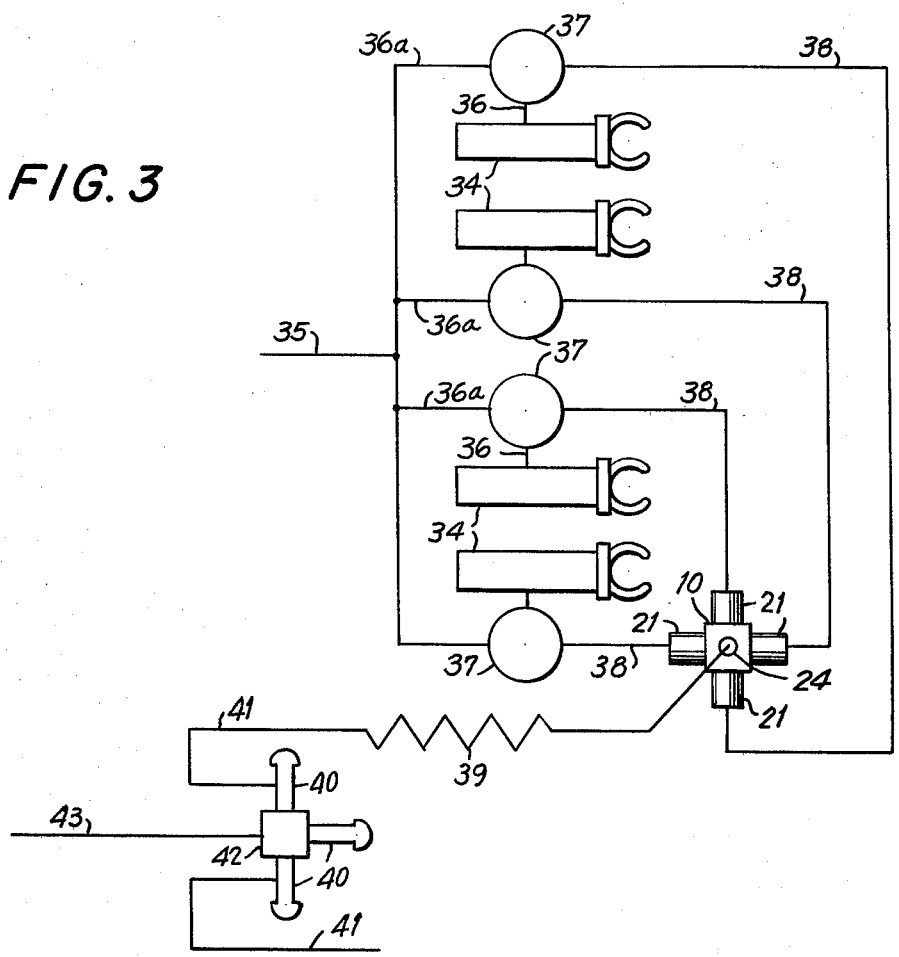
FIG. 3 is a highly simplified, schematic representation of the paint spray purge system of the R. F. Wiggins co-pending application utilizing the positive check valve control unit of the present invention.

Each of the check valve assemblies 21 includes a threaded nipple 22 by which the valve assembly is secured to the valve body 10. An O ring 19 surrounds each inlet port 23 to seal the check valve 21 in relation to the valve body 10. The check valve assembly 21 also includes a passage 25 with a discharge opening communicating with the common outlet duct 24. A spring holder 26 is securely positioned within a threaded portion of the passage 25, between the inlet and discharge thereof. The inlet end of passage 25 is threaded to receive a purge line connector fitting from a spray device, as can be seen in FIG. 3. A ball check 27 is movably positioned within the passage 25 between the spring holder 26 and a valve seat 60 formed at the discharge end of the passage. The valve seat 60 is contoured to the spherical surface of the ball check 27 so that the ball check 27 may be received therein to close the passage 25. The valve seat 60 is so positioned within the passage as to permit the ball 27 to protrude slightly into the common outlet duct 24, as shown in FIG. 1. Preferably, the ball check 27 is made from a synthetic material such as Teflon (duPont) and is typically about ⅜ inch in diameter. A biasing spring 28 acts between the spring holder 26 and ball check 27 to lightly urge the ball check 27 toward the seat 60.

In the illustrated device, the plunger shaft 17 extends axially through the bore 18 into the common outlet duct 24. A packing seal 29 surrounds the shaft 17, and a guide bushing 30 is also provided to achieve a proper axial movement of the plunger shaft 17.

In accordance with the present invention, a cam plunger 31 is secured to the end of the plunger shaft 17 protruding into the common outlet duct 24. The geometry of the cam 31 is such that the cam engages and axially displaces the ball checks 27 from their protruding positions, upon downward axial movement of the plunger shaft 17. To particular advantage, a set of springs 32, 33 acting between the valve body 10 and actuator disc 16 urge the shaft 17 and cam plunger 31 to retract out of contact with the ball checks 27. As a result, the passages 25 normally remain closed.

Referring now to FIG. 3, there is shown, in a highly simplified form, a schematic representation of a paint spray purge system according to the beforementioned Wiggins co-pending application, utilizing the positive check valve control unit of the present invention. Individual spray guns 34 are connected through lines 36 to the downstream side of regulating devices 37. The inlet side of the regulating devices are connected through lines 36a to a common supply line 35. The supply line 35 leads to the fluid selection system (not shown) of the Wiggins application.

Individual purge lines 38 are connected to the various spray guns 34 at or downstream of the regulated side of the regulating devices 37. Each purge line 38 is connected directly to the inlet of a check valve 21. The common outlet duct 24 is advantageously connected to an elongated inventory line 39. The inventory line 39 is connected through a line 41 to a trap valve 40. Desirably, the trap valve 40 is part of a purge manifold 42 which can accommodate several other sets of spray devices 34. The purge manifold 42 is connected to a common purge outlet line 43 which terminates at the purged paint discharge system (not shown) system of the Wiggins co-pending application.

At the commencement of a color change operation a solvent is flushed through a supply line 35 into and through the regulating devices 37. By control means not forming part of the invention, the spray devices are closed, and high pressure control air is admitted to the regulators 37 to increase the regulated pressure level. The high pressure control air is also fed through the connector fitting 20 into the bellows 13. The air causes the bellows 13 to expand, and the resulting movement advances the shaft 17 and therefore the cam plunger 31, downwardly into the common outlet duct 24. The cam plunger 31 will then engage the protruding portions of the ball checks 27 and displace them axially against the biasing springs 28 to open the passages 25, thereby allowing the solvent to push the original paint from the regulating device 37 through line 38 to the inventory line 39.

An important feature of the present invention is the use of a simple and reliable cam plunger advancement to positively open the check valves 21. In prior color change systems individual check valves were located at the several spray devices of the paint spray system. The pressure of the flowing purged paint was relied upon to open the individual check valves, displace the ball checks and under adverse conditions, this pressure may not be sufficent to properly open the check valve. The present invention insures the proper functioning of each check valve by utilizing a simple yet highly effective arrangement of check valves in a common valve body, in conjunction with a mechanical opening device.

The present invention provides a highly effective means for positively opening check valves connected to individual spray devices, and thereby obviates the likelihood of malfunction by the individual check valves. Thus, the positive check valve control unit insures proper and efficient operation of a color change system. Moreover, the present invention can be easily incorporated into existing color change systems of the type disclosed in the beforementioned patent or co-pending application. As described above, the positive check valve unit can simply replace the first trap valve and purge line header of the system of the application, since the individual inlet ducts can be connected directly to the spray device regulators and the common outlet duct can be connected to elongated inventory line. In addition, the simple construction of the present invention will facilitate easy and inexpensive manufacture of the control unit.

Furthermore, the positive check valve control unit can be advantageously employed in a high solids paint spray system. The viscosity of the high solid paints requires the spray paint to be heated before being fed to a spray device. If a particular group of spray devices are not in use, the supply line and regulators will cool down. Consequently, considerable heating time will be lost if it is desired to turn on the spray devices. In order to avoid this time delay, a re-circulating system is often included in the paint spray installation.

A re-circulating line is connected to each spray device downstream of its regulator so that heated paint can be continuously flowed through the supply line, regulator and re-circulating line back to the delivery system. This will keep the supply line and regulator uniformly heated even when the spray device is turned off. To particular advantage, the present invention can be used as a trap valve in the re-circulating system. The individual re-circulation lines from each of the spray devices of a predetermined group can be connected to one of the inlet ducts. The common outlet duct can be connected to a common re-circulating line which terminates at the paint delivery system. If the predetermined group of spray devices are shut off, the bellow can be activated opening all the check valves to allow continuous circulation of the heated paint.

While the particular positive check valve control unit described herein is one embodiment of this invention, this invention is not limited to that particular arrangement or application and, as will be appreciated and understood by those skilled in the art, changes may be made therein without departing from the scope of the invention which is defined in the appended claims.

I claim:

1. In a color change system for a paint spray installation, a purge discharge system comprising
   (a) a plurality of spray devices,
   (b) paint spray conduit means connected to each of said spray devices,
   (c) purge discharge conduit means connected to each of said spray devices,
   (d) each of said purge discharge conduit means being connected to a check valve,
   (e) said check valves each being connected to a common valve body provided with a common outlet duct,
   (f) each of the check valves being provided with an opening for communication with said outlet duct and comprising a ball check and biasing means to urge said ball check against a valve seat at said opening, whereby said check valve is normally closed,
   (g) said ball checks each being arranged whereby fluid pressure in the purge discharge conduit means tends to urge the ball check against said valve seat,
   (h) said valve body including selectively operable actuating means to engage and displace said ball checks against said biasing means and fluid pressure to positively open said check valves during a color change cycle, and
   (i) a common purge outlet conduit means connected to common said outlet duct.

2. The color change system of claim 1, further characterized by
   (a) said color change system provided with an air pressure control system,
   (b) said actuating means comprising an air-actuated bellows assembly and
   (c) said bellows assembly being connected to said air pressure control system.

3. The color change system of claim 2, further characterized by
   (a) a cam plunger in said common outlet duct and connected to said bellows assembly for positively opening said check valves upon selective activation of said bellow assembly by air pressure from said air pressure control system.

* * * * *